United States Patent [19]

Dickmann et al.

[11] 3,787,346
[45] Jan. 22, 1974

[54] STICK FOR THE APPLICATION OF ADHESIVE TO SUBSTRATES

[75] Inventors: Heinz Hermann Dickmann, Buhl/Baden; Richard Krattner, Neusatz/Baden, both of Germany

[73] Assignee: UHU-Werk H.u.M. Fischer G.M.b.H., Buhl/Baden, Germany

[22] Filed: Apr. 17, 1972

[21] Appl. No.: 244,950

[30] Foreign Application Priority Data
Apr. 23, 1971  Great Britain .................... 11214/71
July 9, 1971   Great Britain .................... 32246/71

[52] U.S. Cl............ 260/28.5 R, 106/201, 106/207, 106/212, 106/216, 106/230, 117/122 PA, 260/28, 260/28.5 D
[51] Int. Cl. ........................ C08f 45/36, C08g 51/36
[58] Field of Search ... 106/271, 131, 134, 142, 145, 106/171, 191; 260/28, 23 AR, 23 S, 23 AC, 28.5 R; 117/122 PA; 424/64

[56] References Cited
UNITED STATES PATENTS

| | | | |
|---|---|---|---|
| 3,576,776 | 4/1971 | Muszik | 260/29.6 R |
| 3,539,481 | 11/1970 | Parker | 260/27 |
| 3,267,052 | 8/1966 | Brennan | 260/5 |
| 3,088,876 | 5/1963 | Buth | 106/231 |
| 2,380,126 | 7/1945 | Strum | 260/28.5 D |
| 2,548,970 | 4/1951 | Grigsby | 424/64 |
| 2,853,422 | 9/1958 | Jarrett | 424/64 |
| 3,642,980 | 2/1972 | Lachampt | 424/64 |
| 3,417,054 | 12/1968 | Merijan | 260/33.2 R |

OTHER PUBLICATIONS

A. M. Schwartz et al., "Surface Active Agents & Detergents," Vol. II, 1958, pp. 618, 619.
A. H. Warth, "The Chemistry and Technology of Waxes," 2nd edition, Reinhold Publ. Co., New York, 1956, pp. 457–463.

*Primary Examiner*—Morris Liebman
*Assistant Examiner*—P. R. Michl
*Attorney, Agent, or Firm*—Jacobs & Jacobs

[57] ABSTRACT

Adhesive glue sticks are formed from an adhesive dissolved or dispersed in a solvent containing an anionic non-soap surfactant and mixed with aliphatic carboxylic acids having 24 – 50 carbon atoms, and/or esters thereof with alcohols having 1 – 8 carbon atoms, as structuring substance.

5 Claims, No Drawings

STICK FOR THE APPLICATION OF ADHESIVE TO SUBSTRATES

This invention relates to a gluestick for the application of adhesive to substrates to secure them together adhesively.

Copending application Ser. No. 192,340 filed Nov. 26, 1971 (hereinafter called the earlier Application) describes how adhesive gluesticks may be prepared using free long chain aliphatic acids, or esters of such acids, as structuring substance instead of alkali-metal salts of aliphatic carboxylic acids as hitherto known. In this way improved adhesive stick formulations in the acid pH range can be prepared.

The present invention relates to improvements in the invention of said copending Application. Thus we have found that when an anionic non-soap surfactant is incorporated in the adhesive sticks of our previous invention, the resulting stick has improved application properties of the adhesive to a substrate. We have also found that the presence of such a surfactant makes it easier to formulate a stick of adequate rigidity whilst employing at most a minor proportion of organic solvent, such as an alcohol, with the main aqueous medium. Accordingly, the final composition is more readily made as a non-flammable composition.

The present invention therefore provides a gluestick for the application of adhesive material to substrates to secure them together adhesively, which stick consists essentially of an adhesive dissolved or dispersed in a solvent intimately admixed with sufficient of a shape-conferring structuring substance to produce a self-supporting adhesive composition, which substance comprises one or more aliphatic carboxylic acids having on average from 24 to 50 carbon atoms and/or esters of such acids with alcohols having from 1 to 8 carbon atoms, characterised in that the solvent also contains an anionic non-soap surfactant.

The essential structuring substance is described in said copending Application and is preferably a mixture of free long chain aliphatic acids having an average carbon number of from 24 to 50 and obtained by the oxidation of montan wax, e.g., those sold under the trade names "Hoechst Waxes S, L and LP". Mixtures of structuring agents may be employed as stated in the Parent Application.

In the production of the adhesive sticks of the invention the structuring agent is normally dissolved or dispersed in a volatile liquid which most desirably is water or a solvent which is water-miscible or water-immiscible with or without addition of water. Preferably water-miscible organic solvents are used together with sufficient water to render the solvent non-flammable. As suitable volatile liquids there may be mentioned lower monovalent alcohols, as, e.g., methanol, ethanol, isopropanol and n-propanol as well as esters, ketones and ethers such as, for example, methyl ethyl ketone.

As film-forming component for the adhesive sticks of the invention, there is used an adhesive substance soluble or dispersible in the chosen solvent. Such adhesive may be any described in said copending Application and likewise the preferred adhesive is polyvinylpyrrolidone. It is particularly preferred to employ polyvinylpyrrolidone as sold under the trade name Luviskol K.90, especially in conjunction with 2–6 percent by weight of a carbohydrate or modified carbohydrate polymer.

The composition of the adhesive sticks must be so chosen, that a not too soft mass is formed which may be readily rubbed off. This is achieved when the content of the structure forming substance is between 3 and 60 percent, usually from 10 to 40 percent and preferably from 15 to 30 percent.

The volatile liquid component of the compositions of the invention amounts to about 20–80 percent, particularly 30 to 70 percent, and the proportion of adhesive components lies somewhere between 5 and 50 percent, usually between 20 and 40 percent. The quoted percentages are precentages by weight and are based on the total weight of the structure forming substances, the liquid and adhesive components.

The present compositions also contain an anionic non-soap surfactant which will normally be an alkali-metal or alkaline-earth metal salt of an organic sulphonate, sulphate or phosphate wherein there is present an alkyl group of 8 to 20 carbon atoms. Such surfactants are well-known wetting agents, but their use for the present purpose is to be contrasted with the use of non-ionic or cationic surfactants which do not give the same effect in enabling the proportion of organic solvent to be reduced.

For example, there may be used for present purposes sodium salts of the sulphate esters of fatty alcohols or of secondary alcohols having 8 to 20 carbon atoms, or of the condensation products of such alcohols with from 1 to 10 molecules of ethylene oxide, or of the condensation products of alkylphenols having 8 to 18 carbon atoms in the alkyl group with from 1 to 10 molecules of ethylene oxide. Alternatively, there may be employed sodium salts of alkylbenzene sulphonic acids having 9 to 10 carbon atoms in the alkyl group, or of mono- or di-esters of sulphosuccinic acid with alcohols having 8 to 20 carbon atoms. Further examples include the higher fatty acid monoglyceride monosulphates, the higher fatty acid esters of 1,2-dihydroxypropane sulphonate, the higher fatty acid esters of taurine, the higher fatty acid esters of isethionic acid, the α-olefin sulphonates having 8 to 20 carbon atoms and the alkane sulphonates having a similar number of carbon atoms. There may be also employed organic phosphate and phosphonated surfactants, for example the alkali-metal salts of partial phosphate esters of fatty alcohols or products of condensation thereof with up to 20 moles of ethylene oxide or of similar condensation of $C_{8-16}$ alkyl-phenols.

However, it has been found that optimum results are often obtained when a sodium salt of a sulphoacetate ester of an alcohol having 8 to 20 carbon atoms, particularly sodium lauryl sulphoacetate, is present as at least part of the total anionic surfactant. This is surprising because the sulpho-acetates have generally found little use as anionic surfactants, because for most applications the other surfactants mentioned above are superior in contrast to the present application.

The anionic surfactant will normally comprise from 1 to 20 percent, preferably 2 to 6 percent, by weight of the adhesive composition. Often mixtures of different anionic surfactants can be used with advantage to improve the gel strength or the rub-off properties of the adhesive stick of the invention.

Other adjuvants that do not inhibit the self-supporting properties of the compositions of the invention can also be present as described in the copending Application. The use of up to 2 percent by weight of a vinylsulphonate salt also advantageously improves the rub-off characteristics of the adhesive sticks.

The adhesive sticks of the invention may be prepared and packaged as described in the copending Application. Likewise, the consistency of the adhesive sticks may be varied within wide limits by the type and quantity of structuring agent, adhesive and other additives. The invention may therefore be easily adapted to various technical application requirements.

The invention is illustrated by the following examples in which quantities are expressed on a weight basis. The wax acids mixture used in the carrying out of the Examples, which was also used for the manufacture of the glycol wax acid esters similarly used, was a commercially available Montan acid containing saturated aliphatic carboxylic acids having 19 to 33 carbon atoms with an average carbon number of from 24 to 33.

EXAMPLES 1-3

The following formulations were prepared:

|  | Ex. 1 | Ex. 2 | Ex. 3 |
|---|---|---|---|
| Polyvinyl pyrrolidone (mol. weight about 90,000) | 25 | 25 | 25 |
| Wax Acid Mixture | 10 | 10 | 15 |
| Sodium lauryl sulphate | 5 | 5 | — |
| Sodium lauryl sulpho-acetate | 5 | 5 | 5 |
| Propylene glycol | 5 | 5 | 5 |
| Sorbitol | — | — | 10.5 |
| Ethanol | 5 | 25 | 25 |
| Water | 45 | 25 | 14.5 |
|  | 100 | 100 | 100 |

In each case the ingredients other than the polymer were mixed and heated to 75°C until a homogeneous solution formed. The polyvinyl pyrrolidone was then added slowly and the mixture stirred until homogeneous and air-free. It was then poured into a mould and allowed to set. In each case a self-supporting gel was formed having adhesive properties.

EXAMPLES 4-7

The following formulations were prepared:

|  | Example 4 | Example 5 | Example 6 | Example 7 |
|---|---|---|---|---|
| Polyvinyl pyrrolidone (mol. weight about 700,000) | 25 | 25 | 25 | 15 |
| Dextrin | — | — | — | 4 |
| Wax acid mixture | 10 | 10 | 15 | 18 |
| Sodium lauryl sulphate | 5 | 5 | — | — |
| Sodium lauryl sulpho-acetate | 5 | 5 | 5 | 2 |
| Sodium vinyl sulphonate (25% solution) | — | — | — | 0.3 |
| Sodium salt of phosphated ethoxylated fatty alcohol ("Gafac" LO-529) | — | — | — | 0.7 |
| Propylene glycol | 5 | 5 | 5.0 | — |
| Sorbitol | — | — | 10.5 | — |
| Glycerol | — | — | — | 16 |
| Ethanol | 5 | 25 | 25 | — |
| Water | 45 | 25 | 14.5 | 44 |
|  | 100 | 100 | 100 | 100 |

In each case the ingredients other than the polymer were mixed and heated to 85°C until a homogeneous solution formed. The polyvinyl pyrrolidone was then added slowly and the mixture stirred until homogeneous and air-free. It was then poured into a mould and allowed to set. In each case a self-supporting gel was formed having adhesive properties.

EXAMPLES 8-11

The following formulations were formulated in similar manner to those of Examples 5-7. In each case solid adhesive sticks were obtained.

|  | Example 8 | Example 9 | Example 10 | Example 11 |
|---|---|---|---|---|
| Polyvinyl pyrrolidone (mol. weight about 700,000) | 15 | 17 | 17 | 17 |
| Dextrin | 4 | — | — | — |
| Methyl cellulose | — | 2 | — | — |
| Amylum non mucilaginosum | — | 2 | — | — |
| Hydroxy ethyl cellulose | — | — | 1 | — |
| Gum arabic | — | — | — | 5.4 |
| Wax acid mixture | — | 13 | 15 | 13 |
| Wax ester (triethyleneglycol ester of wax acid mixture) | 18 | — | — | — |

|  | Example 8 | Example 9 | Example 10 | Example 11 |
| --- | --- | --- | --- | --- |
| Sodium lauryl sulpho-acetate | 2 | 1.6 | 1.6 | 1.6 |
| Glycerol | 16 | 21 | 21 | 21 |
| Water | 45 | 43.4 | 44.4 | 42 |
|  | 100 | 100 | 100 | 100 |

We claim:

1. In an adhesive gluestick for the application of adhesive material to substrates to secure them together adhesively which consists essentially of:
   a. 3 to 60 percent of structuring substance which is one or more carboxylic acids having on average from 24 to 50 carbon atoms or an ester of such acids with alcohols having from 1 to 8 carbon atoms;
   b. from 20 to 80 percent of a volatile liquid solvent which is water, a lower monovalent alcohol or a mixture thereof; and
   c. from 5 to 50 percent of a polymer or copolymer of N-vinyl-pyrrolidone as adhesive, the improvement which consists in that there is also present from 2 to 6 percent of anionic non-soap surfactant comprising an organic sulphonate, sulphate or phosphate containing an alkyl group of from 8 to 20 carbon atoms, the percentages each being by weight based on the total weight of the aforesaid components.

2. Adhesive gluesticks according to claim 1, wherein the said anionic non-soap surfactant comprises a sodium salt of a sulpho-acetate ester of an alcohol having 8 to 20 carbon atoms.

3. Adhesive gluesticks according to claim 1, wherein the said anionic non-soap surfactant comprises sodium salts of sulphate esters of fatty or secondary alcohols having 8 to 20 carbon atoms.

4. Adhesive gluesticks according to claim 3, wherein the mixture of wax acids has an average carbon number of from 24 to 33.

5. Adhesive gluesticks according to claim 1 which also comprise up to 2 percent of a vinyl sulphonate salt.

* * * * *